US008243746B2

(12) United States Patent
Di Benedetto

(10) Patent No.: US 8,243,746 B2
(45) Date of Patent: Aug. 14, 2012

(54) ETHERNET NODE PORT VIRTUALIZER

(75) Inventor: Marco Di Benedetto, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 12/658,022

(22) Filed: Feb. 1, 2010

(65) Prior Publication Data

US 2011/0188511 A1  Aug. 4, 2011

(51) Int. Cl.
*H04L 12/28* (2006.01)
*H04L 12/56* (2006.01)
*G06F 17/00* (2006.01)

(52) U.S. Cl. ............. 370/419; 370/392; 370/401; 726/1

(58) Field of Classification Search .................. 370/389, 370/392, 401, 419; 726/1
See application file for complete search history.

(56) References Cited

U.S. PATENT DOCUMENTS

| | | | |
|---|---|---|---|
| 2006/0023707 A1* | 2/2006 | Makishima et al. | 370/389 |
| 2007/0071011 A1* | 3/2007 | de Heer et al. | 370/395.53 |
| 2009/0037977 A1* | 2/2009 | Gai et al. | 726/1 |
| 2009/0245791 A1 | 10/2009 | Thaler et al. | |
| 2009/0254677 A1 | 10/2009 | Desanti | |
| 2009/0292813 A1 | 11/2009 | Snively | |

OTHER PUBLICATIONS

INCITS Draft Standard FC-BB-5, "Fibre Channel, Backbone—5", T11/Project 1871-D/Rev. 2.0, Jun. 4, 2009.
John L. Hufferd:"Proxy Based Shortcut", Oct. 7, 2009, XP002639908, Retrieved from the internet: URL:http://www.t11.org/ftp/t11/pub/fc/bb-6/09-515v0.pdf.

* cited by examiner

*Primary Examiner* — Ronald Abelson
(74) *Attorney, Agent, or Firm* — Cindy Kaplan

(57) ABSTRACT

In one embodiment, a method includes defining a virtual node port proxy and virtual fabric port proxies at a Fiber Channel over Ethernet (FCoE) bridge, the virtual node port proxy in communication with an FCoE forwarder, each of the virtual fabric port proxies in communication with an FCoE node in an FCoE network. The method further includes proxying FCoE Initialization Protocol (FIP) functions between the FCoE nodes and the FCoE forwarder at the FCoE bridge. An apparatus is also disclosed.

20 Claims, 5 Drawing Sheets

ETHERNET NODE PORT VIRTUALIZER

BACKGROUND

The present disclosure relates generally to communications networks, and more particularly, to Fibre Channel over Ethernet (FCoE).

Demands for increasing link speeds and computing speeds have driven a variety of specialized computer networking architectures. There are networking architectures, such as Ethernet, which are widely utilized for communications based on Internet Protocol (IP). There are other networking architectures, such as Fibre Channel (FC), which are widely utilized in Storage Area Networks (SANs). FCoE is a technology for sending Fibre Channel traffic over Ethernet in order to enable a single networking technology to be utilized for both IP communications and SANs.

FCoE may use, for example, encapsulation of Fibre Channel frames over Ethernet networks. This allows Fibre Channel to leverage Ethernet networks while preserving the FC protocol. The International Committee for Information Technology and Standards (INCITS) recently released standard FC-BB-5 ("Fibre Channel, Backbone-5", Jun. 4, 2009), which covers FCoE. FC-BB-5 describes enhancements to Ethernet bridges in the path between FCoE endpoints. The bridges implementing these enhancements are referred to as FCoE Initialization Protocol (FIP) snooping bridges. FIP snooping bridges address certain Ethernet data plane connectivity concerns, however, there still exists manageability issues that are not covered by the standard.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
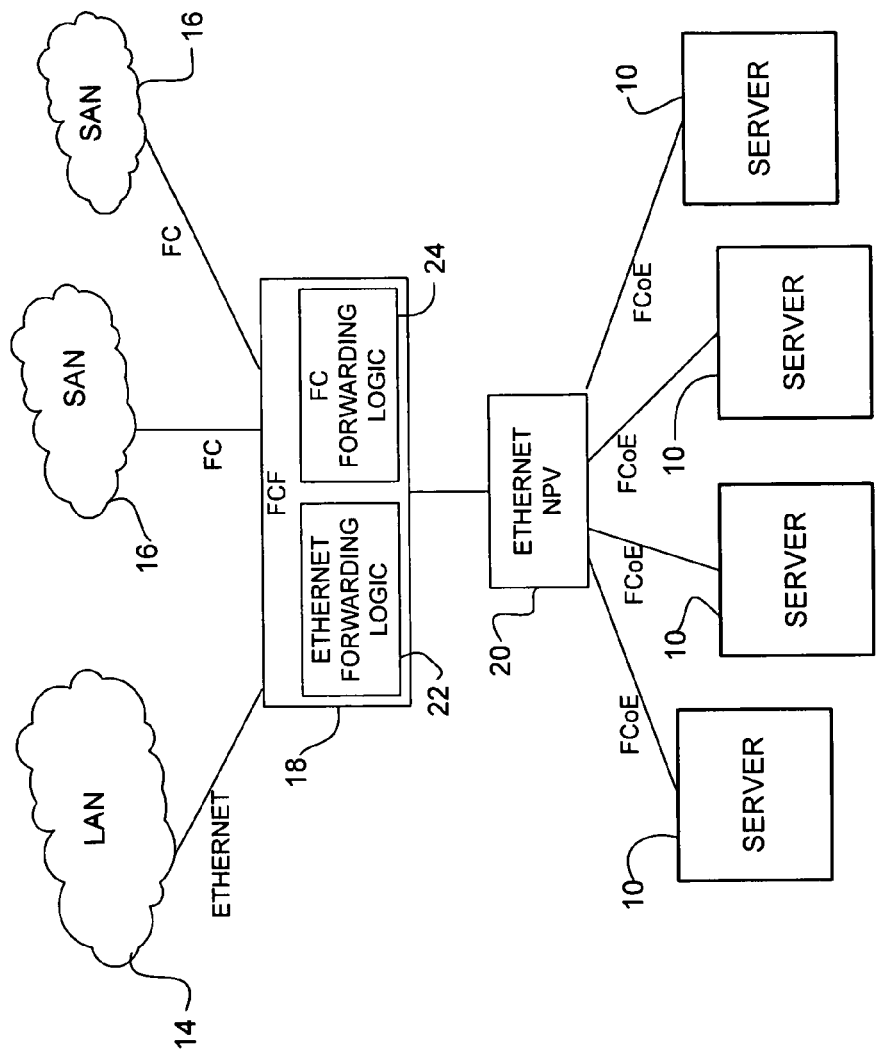
FIG. 1 illustrates an example of a network in which embodiments described herein may be implemented.

In one embodiment, a method generally comprises defining a virtual node port proxy and virtual fabric port proxies at a Fibre Channel over Ethernet (FCoE) bridge, the virtual node port proxy in communication with an FCoE forwarder, each of the virtual fabric port proxies in communication with an FCoE node in an FCoE network. The method further includes proxying FCoE Initialization Protocol (FIP) functions between the FCoE nodes and the FCoE forwarder at the FCoE bridge.

In another embodiment, an apparatus generally comprises a virtual node port proxy configured for communication with a Fibre Channel over Ethernet (FCoE) forwarder, a plurality of virtual fabric port proxies configured for communication with FCoE nodes in an FCoE network, and a processor for proxying FCoE Initialization Protocol (FIP) functions between the FCoE nodes and the FCoE forwarder.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications without departing from the scope of the invention. Thus, the invention is not to be limited to the embodiments shown, but is to be accorded the widest scope consistent with the principles and features described herein. For purpose of clarity, details relating to technical material that is known in the technical fields related to the embodiments have not been described in detail.

Fibre Channel over Ethernet (FCoE) provides for the transport of Fibre Channel payloads on top of an Ethernet network. The INCITS FC-BB-5 standard describes an FCoE Initialization Protocol (FIP) snooping bridge for use in a path between FCoE endpoints (e.g., FCoE forwarders (FCFs) and ENodes/Converged Network Adaptors (CNAs)). The FIP snooping bridge transparently relays FIP functions between the FCFs and ENodes. The FIP snooping bridge has a number of drawbacks. For example, the FIP snooping bridge does not address manageability concerns that arise in attempting to build a deployable end-to-end FCoE network. The concerns include the ability to manage and troubleshoot an FCoE network when FIP snooping bridges are in use, and the amount of freedom left to CNAs in making decisions that can impact the resulting FCoE topology. More freedom at the CNAs results in higher potential for different implementations to result in different outcomes given the same set of constraints. Also, since FIP snooping bridges are expected to be transparent to Fibre Channel, they can make troubleshooting difficult. FIP snooping bridges also change traditional FC management.

The embodiments described herein provide an Ethernet Node Port (N_Port) Virtualizer (NPV), which intelligently proxies certain FIP functions between a CNA (FCoE node) and an FCF. The ability to proxy FIP functions on an Ethernet device directly attached to the CNA enables the implementation to build useful constraints to limit the freedom the CNA has in interpreting the FCoE standard, thus providing increased interoperability and predictability in the FCoE network. Ethernet NPV puts the 'passthrough' device in control. This limits expectations from the CNAs and provides simpler CNAs, which improves interoperability. Ethernet NPV also provides familiar management and troubleshooting to SAN administrators.

Referring now to the drawings, and first to FIG. 1, a network in which embodiments described herein may be implemented is shown. The network includes a plurality of servers (FCoE nodes (ENodes)) 10 in communication with an FCoE forwarder (FCF) 18. Each of the servers 10 includes a Converged Network Adapter (CNA). The FCF 18 shown in FIG. 1 is in communication with a Local Area Network (LANs) 14 via an Ethernet connection, and Storage Area Networks (SANs) 16 via Fibre Channel (FC) connections. The LAN 14 may comprise a plurality of network devices in communication over Ethernet links, for example. The SAN 16 may comprise a plurality of remote computer storage devices, such as disk arrays or tape libraries, and utilize a Fibre Channel fabric topology, for example.

The FCF 18 communicates with the servers 10 over an FCoE network. The FCF 18 includes Ethernet forwarding logic 22 and FC forwarding logic 24. The FCF 18 is configured to forward Fibre Channel packets from the servers 10 to the SANs 16 and forward Fibre Channel packets from the SANs to one or more of the servers based on encapsulation of the received Fibre Channel packets in the FCoE packets. The FCF 18 is also operable to forward Ethernet packets from the servers 10 to the LAN 14 and forward Ethernet packets from the LAN to one or more of the servers. The FCF 18 includes suitable logic, interfaces, code, or circuits operable to encapsulate FC packets into FCoE packets, decapsulate FCoE packets into FC packets, and perform Ethernet switching operations.

Figure 2:
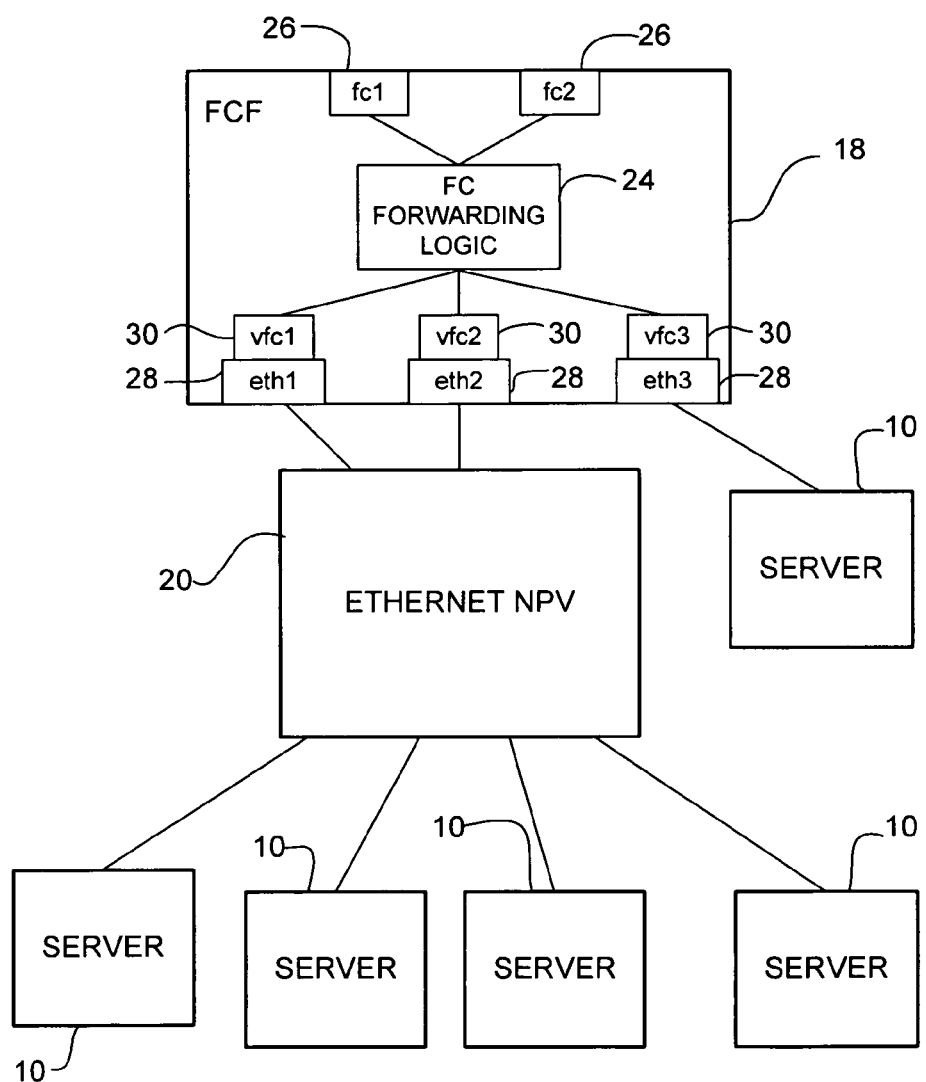
FIG. 2 illustrates details of an FCoE Forwarder (FCF) in communication with an Ethernet Node Port Virtualizer (NPV) in the network of FIG. 1.

The path between the FCF 18 and servers 10 include an FCoE bridge, referred to herein as an Ethernet Node Port Virtualizer bridge (or Ethernet NPV) 20. The Ethernet NPV 20 is configured to proxy FIP functions between the server 10 and FCF 18, as described in detail below. The Ethernet NPV 20 controls how a live network builds FCoE connectivity, thus making connectivity predictable, without the need for an FCF at the next hop from the CNA. As illustrated in FIGS. 1 and 2, and described below, the Ethernet NPV 20 is interposed between one or more of the servers 10 and the FCF 18. The NPV 20 may be located at the same device as the FCF 18 or may be incorporated in a separate device located between the servers 10 and the FCF. For example, the Ethernet NPV 20 may be incorporated in an access layer switch, a blade switch, or a fabric interconnect.

For simplification, only one FCF 18 is shown in FIGS. 1 and 2. It is to be understood that the servers 10 may be in communication with more than one FCF 18, and the FCF may be in communication with any number of LANs and SANs, another FCF, FC switch or other network device.

Endpoints for the Ethernet encapsulation of Fibre Channel frames are FCoE nodes (ENodes, servers 10) and the FCF 18. ENodes are the combination of FCoE termination functions and Fibre Channel stack on the CNAs, and in that sense are equivalent to host bus adapters (HBAs) in native FC networks. The FCF 18 is the combination of FCoE termination functions and Fibre Channel stack on an Ethernet switch (dual-stack switch) and is therefore equivalent to FC switch in native FC networks.

As illustrated in FIG. 2, the FCF 18 includes a plurality of Ethernet ports for communication with the server 10, Ethernet NPV 20, or Ethernet Fabric, and Fibre Channel (FC) ports for communication with the SANs 16. The FC forwarding logic 24 at the FCF 18 connects FC ports (fc1, fc2) 26 with Ethernet ports (eth1, eth2, eth3) 28. Each of the Ethernet ports 28 is associated with a virtual FC port (vfc1, vfc2, vfc3) 30.

In the Fibre Channel network, FC ports of FC nodes are designated as N_ports (node ports). FC ports of FC switches are designated as F_ports (fabric ports connected to N_ports) or E_ports (expansion ports connecting two switches). In the FCoE network, these constructs become virtual, because ports of ENodes and FCFs are Ethernet ports. Thus, the ports facing the servers 10 at the FCF 18 are VF_ports (virtual F_ports) and the ports at the server are VN_ports (virtual N_ports). FCoE defines the behavior of a logical connection between the ENode 10 and the FCF 18 as a VN_port to VF_port virtual link. The virtual link established between the VN_port of the server 10 and the VF_port at the FCF 18 maps to an Ethernet path that includes the Ethernet NPV 20. The Ethernet NPV is an FCoE passthrough switch and does not have an FC stack. Thus, the Ethernet NPV 20 makes forwarding decisions based on Ethernet semantics. As described further below, the Ethernet NPV 20 proxies FIP functions so that FIP exchanges at the server 10 appear as point-to-point exchanges. The servers 10 are mapped to the Ethernet NPV 20 so that there is no need to map the servers to the FCF 18.

FCoE Initialization Protocol (FIP) is used to establish and maintain FC virtual links between the ENodes (servers 10) and the FCF 18. FCoE packets are exchanged in a virtual LAN (VLAN). FCoE traffic belonging to different virtual SANs (VSANs) remain separated by different VLANs on the Ethernet plane. During the virtual link establishment phase, FIP first discovers FCoE VLANs and remote virtual FC interfaces and then performs virtual link initialization functions (Fabric Login (FLOGI) and Fabric Discovery (FDISC)) or exchange link parameters (ELPs) similar to their native FC equivalents. After the virtual link is established, FC payloads can be exchanged on the virtual link, and FIP remains in the background to perform virtual link maintenance functions and continuously verify reachability between the two virtual FC interfaces on the Ethernet network. As described in detail below, the Ethernet NPV bridge 20 operates as a proxy to perform at least some of these FIP functions.

Figure 3:
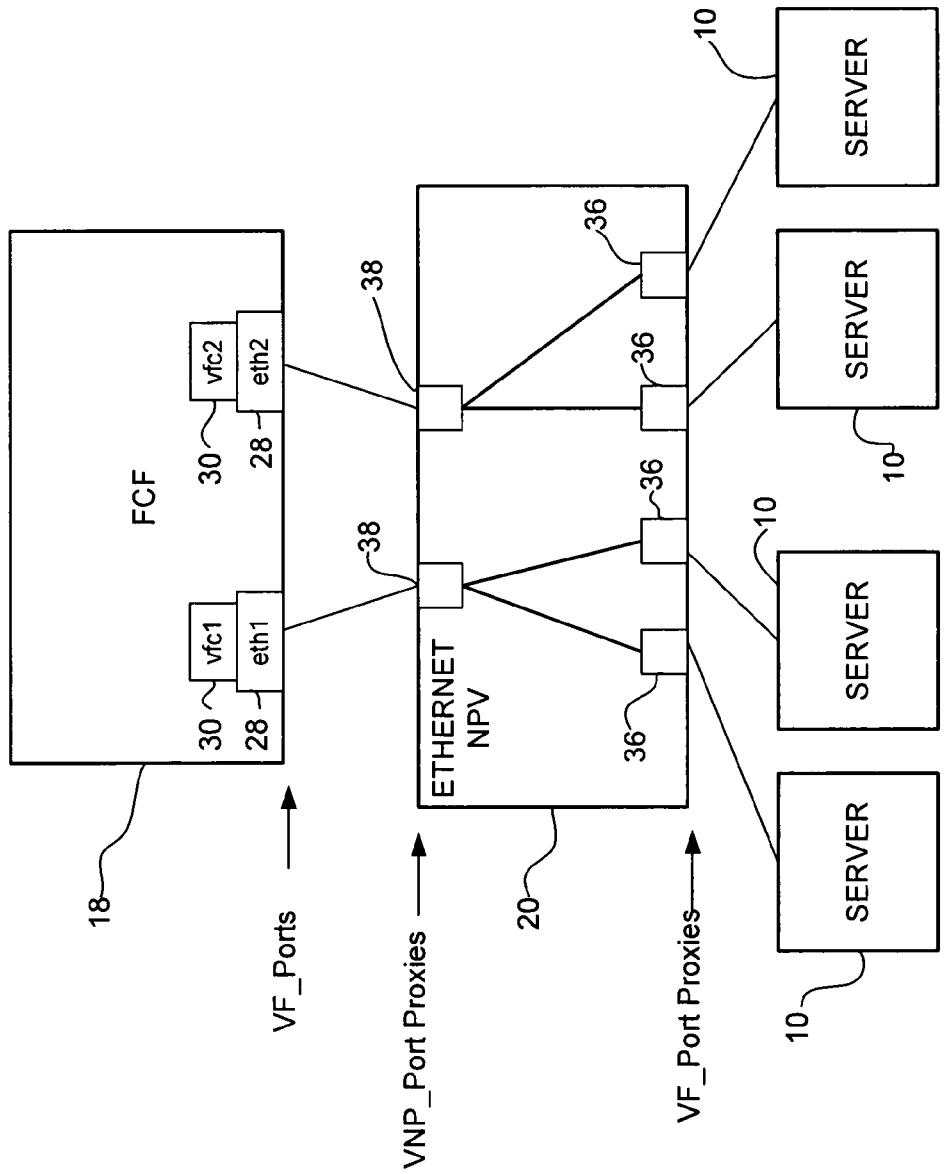
FIG. 3 illustrates virtual port proxies at the Ethernet NPV for proxying FCoE Initialization Protocol functions (FIP) between the FCF and FCoE nodes in the network of FIG. 1.

FIG. 3 illustrates connections at the Ethernet NPV 20, between the FCF 18 and the servers 10. The Ethernet NPV 20 connects to VF_ports at the FCF 18. The Ethernet NPV 20 defines virtual N_port proxies (VNP_port proxies) 38 facing the FCF 18 and virtual F_port proxies (VF_port proxies) 36 at the ports in communication with the ENodes (servers) 10. The roles at these proxy ports are explicitly defined and traffic can only flow in one direction or the other, not from VF_port to VF_port or from VNP_port to VNP_port. This provides static traffic engineering. With FIP snooping, roles are explicitly defined only for virtual FC ports facing FCFs. Thus, when using FIP snooping, it is not known if logins will be received from ports at the FIP snooping bridge ports facing the servers or the FIP snooping bridge ports facing the FCF. Also, in FIP snooping, there is a regular Ethernet bridge running STP (Spanning Tree Protocol) to prevent loops. This results in dynamic traffic engineering on MAC (Media Access Control) tables based on snooping FIP packets.

On the control plane (FIP Ethertype), the Ethernet NPV bridge 20 improves over an FIP snooping bridge by intelligently proxying FIP functions between the CNA (server 10) and the FCF 18. In this way, the Ethernet NPV bridge takes control of how a live network builds FCoE connectivity, thus making the connectivity very predictable, without the need for an FCF 18 at the next hop from the CNA. On the data plane (FCoE Ethertype), the Ethernet NPV bridge 20 offers more ways to engineer traffic between CNA-facing ports 36 and FCF-facing ports 38.

Figure 4:
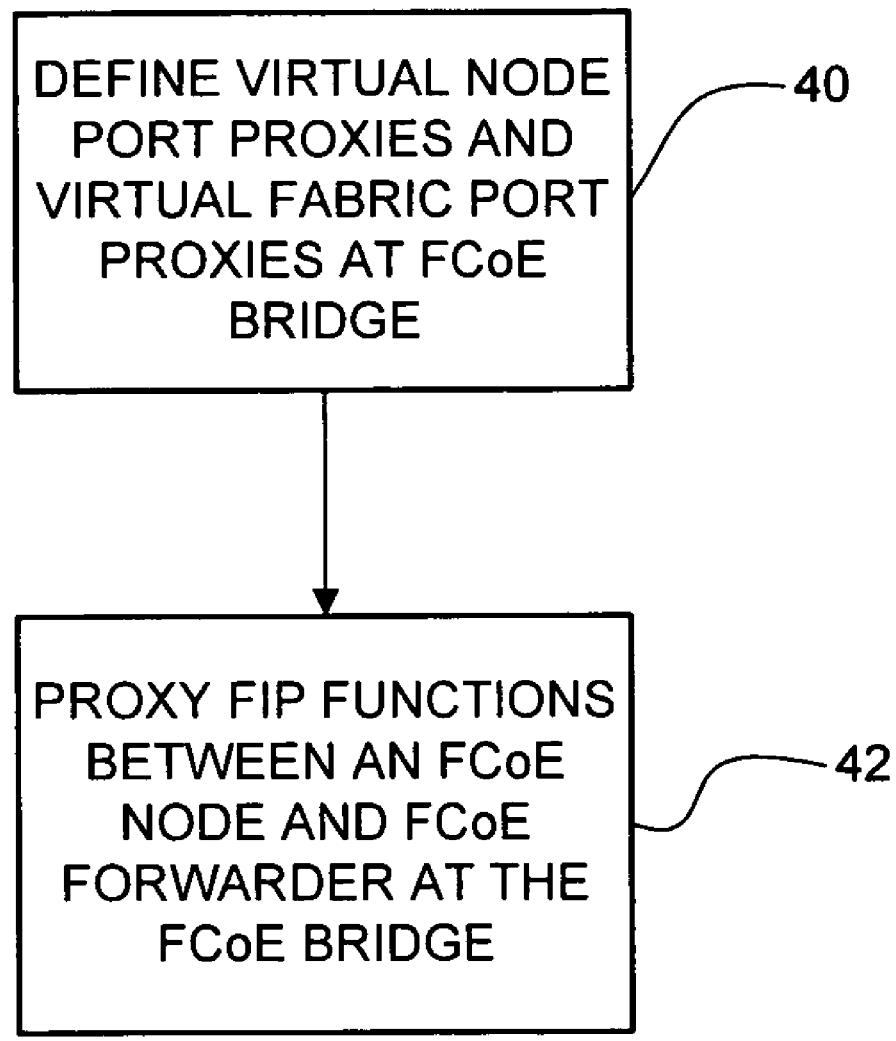
FIG. 4 is a flowchart illustrating an overview of a process for proxying FIP functions at the Ethernet NPV of FIG. 3, in accordance with one embodiment.

FIG. 4 is a flowchart illustrating an overview of a process for proxying FIP functions at the Ethernet NPV bridge. At step 40, one or more virtual node port proxies 38 and fabric port proxies 36 are defined at an FCoE bridge (Ethernet NPV 20). The virtual node port proxies 38 are configured for communication with an FCoE forwarder (FCF 18) and each of the virtual fabric port proxies 36 are configured for communication with an FCoE node (server 10) in an FCoE network. At step 42, the FCoE bridge 20 proxies FCoE Initialization Protocol (FIP) functions between the FCoE node 10 and the FCoE forwarder 18. Thus, the FCoE bridge (Ethernet NPV 20) acts as an intermediary for virtual link establishment or management functions of HP, between the FCoE nodes 10 and the FCF 18.

The following provides examples for proxying certain FIP functions at the Ethernet NPV 20. The Ethernet NPV 20 may be configured to proxy one or more of these or other FIP functions.

In one embodiment, the Ethernet NPV bridge 20 proxies FIP VLAN discovery so that any CNA (server 10) directly attached to the Ethernet NPV bridge can be forced to belong to one VLAN (and therefore one VSAN), as opposed to leaving CNAs the flexibility to choose among a list of VLANs (and therefore multiple VLANs).

With Ethernet NPV, the decision for VSAN membership is done at the VF_port proxies 36 and no discovery of the FCF 18 is needed. With the FIP snooping bridge, VSAN membership is only known at the virtual FC ports at the FCF and needs to be discovered by FIP snooping.

In one embodiment, the Ethernet NPV bridge 20 proxies FCF FIP advertisements so that any CNA directly attached to the Ethernet NPV bridge can be forced to login into a specific FCF 18, as opposed to leaving CNAs the flexibility to choose among a list of FCFs. The FC-BB-5 standard defines a way for FCFs to assign priorities to their advertisement messages to encourage CNAs to login into the FCF with the highest priority. However, CNAs may not wait for all FCFs to send their advertisements and the standard does not define how FCFs should coordinate among themselves which priority to use in advertisements to individual CNAs. Ethernet NPV solves both of these ambiguities.

In one embodiment, the Ethernet NPV bridge 20 proxies FIP Keep Alive (FKA) messages. After login, FCFs 18 and CNAs (servers 10) continuously exchange FKA messages to verify reachability. By virtue of the Ethernet NPV bridge 20 directly attached to the CNA, the Ethernet NPV bridge can verify reachability by detecting physical link up and link down events on the network interface directly attached to the CNA. The Ethernet NPV 20 can therefore proxy FKA messages to the FCF 18 on behalf of the CNA, and potentially multiplex all CNAs into a single FKA message destined to the FCF, thereby reducing resources (network bandwidth and network device CPU) used by the messaging. If the FCF 18 is also directly attached to the Ethernet NPV 20, FKA messages can be dismissed altogether, and physical connectivity events, which are faster signals of reachability, can be used to inform CNAs and FCFs of reachability. Without the need for FIP keep alive messages, reachability failures can be detected much faster, therefore enabling faster triggers for high availability operations such as SAN multipathing.

If load balancing is performed with the Ethernet NPV bridge 20, it may be decided by the VNP_port proxies 38 under full control of the Ethernet NPV switch vendor. This reduces the chances for spoofing. In contrast, load balancing with FIP snooping depends on the ports at the servers (CNAs) and FCFs. Everything is thus CNA implementation dependent and is therefore dynamic and potentially unpredictable.

Figure 5:
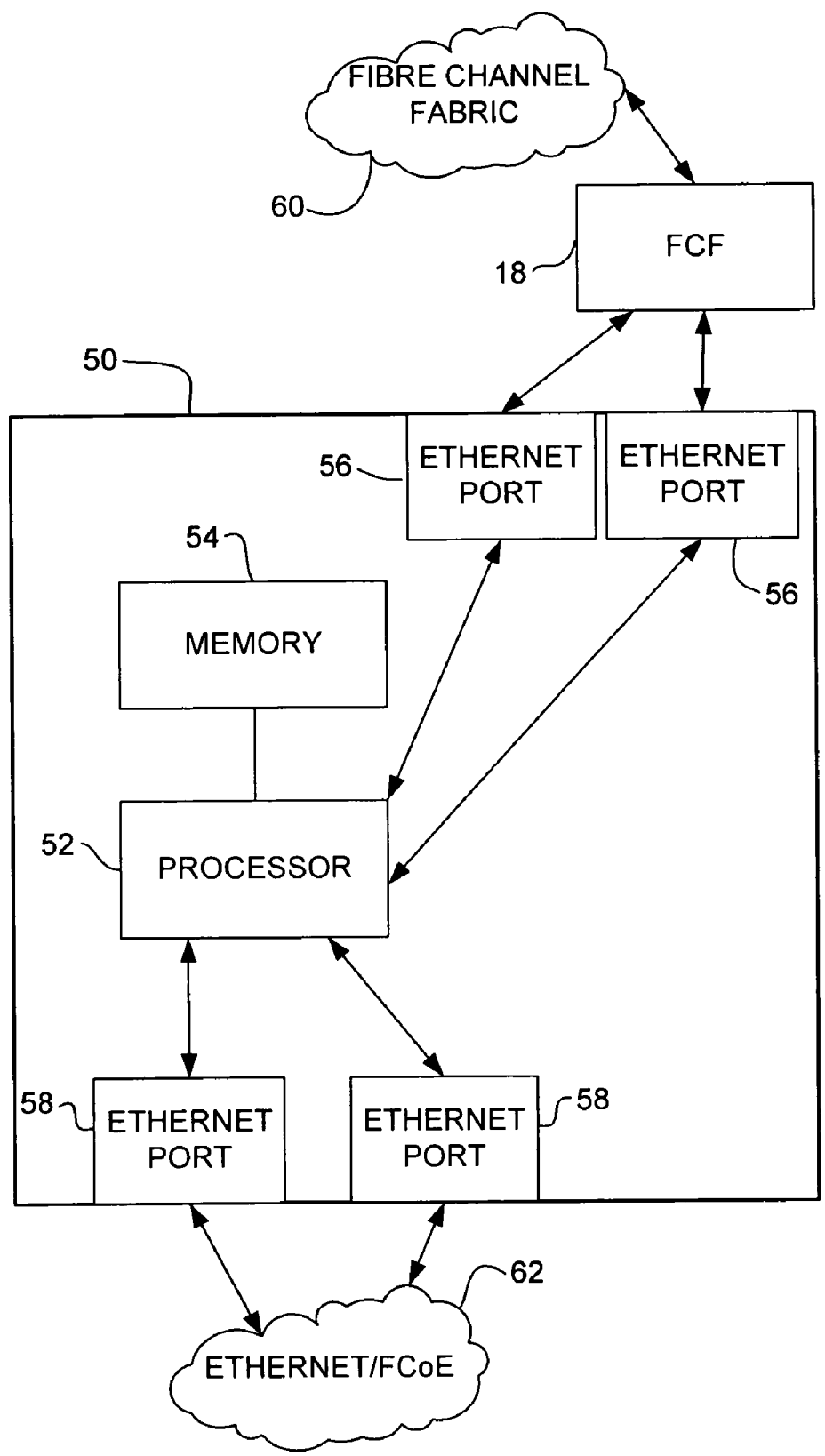
FIG. 5 is a block diagram illustrating an example of a network device useful in implementing embodiments described herein.

FIG. 5 depicts a network device (Ethernet NPV) 50 that may be used to implement embodiments described herein. The network device 50 is configured to implement all of the network protocols and extensions thereof described herein. The network device may include, for example, one or more processors 52 (e.g., central processing unit (CPU), multiple processors), memory 54, and Ethernet ports 56, 58. When acting under the control of appropriate software or firmware, the processor 52 is responsible for such tasks as encapsulation/decapsulation, switching functions, and general processing of packets. The processor 52 preferably accomplishes all of these functions under the control of software including an operating system and any appropriate applications software. Logic may be encoded in one or more tangible media for execution by the processor 52. For example, the processor 52 may execute codes stored in the memory 54. The memory 54 is one example of a computer-readable medium. The memory 54 may be a volatile memory. Another form of computer-readable medium storing the codes is a type of non-volatile storage such as floppy disks, CD-ROMs, DVD-ROMs, hard disks, flash memory, etc.

Network device 50 includes a plurality of Ethernet ports 56, 58. In the example shown in FIG. 5, the ports 56 are in communication with FCF 18, which is in communication with an FC fabric 60. The ports 58 are in communication with an Ethernet fabric 62 operable to carry one or both of Ethernet traffic and FCoE traffic.

It is to be understood that the network device 50 shown in FIG. 5 and described herein is only one example and that different configurations of network devices may be used.

As can be observed from the foregoing, the embodiments described herein provide numerous advantages. For example, one or more embodiments allow an Ethernet bridge between a CNA and FCF to track closely the interactions between those endpoints and build constraints that enable predictable FCoE network bringup. A user may fine tune the FCoE overlay in one place (Ethernet NPV bridge), without having to make assumptions about the CNA implementation. These advantages can be obtained without needing to implement a Fibre Channel stack on the Ethernet NPV bridge which has to understand only FIP, not Fibre Channel.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
    defining a virtual node port proxy and virtual fabric port proxies at a Fibre Channel over Ethernet (FCoE) bridge, said virtual node port proxy in communication with an FCoE forwarder, each of said virtual fabric port proxies in communication with an FCoE node in an FCoE network; and
    proxying FCoE Initialization Protocol (FIP) functions between the FCoE nodes and the FCoE forwarder at the FCoE bridge;
    wherein defining a virtual node port proxy comprises defining a plurality of virtual node port proxies and further comprising mapping each of the FCoE nodes to one of said virtual node port proxies at the FCoE bridge.

2. The method of claim 1 wherein proxying FIP functions comprises proxying FIP virtual local area network discovery at the FCoE bridge.

3. The method of claim 1 wherein proxying FCoE FIP functions comprises proxying FCoE forwarder FIP advertisements at the FCoE bridge to associate one of the FCoE nodes with the FCoE forwarder.

4. The method of claim 1 wherein proxying FCoE FIP functions comprises proxying keep alive messages to verify reachability with the FCoE nodes at the FCoE bridge.

5. The method of claim 4 further comprising multiplexing keep alive messages from the FCoE nodes into a single keep alive message and transmitting said keep alive message to the FCoE forwarder.

6. The method of claim 1 wherein the FCoE forwarder is directly connected to the FCoE bridge and further comprising using physical connectivity events to determine reachability between the FCoE bridge and the FCoE nodes and between the FCoE bridge and the FCoE forwarder.

7. The method of claim 1 further comprising load balancing traffic at the FCoE bridge.

8. An apparatus comprising:
- a virtual node port proxy configured for communication with a Fibre Channel over Ethernet (FCoE) forwarder;
- a plurality of virtual fabric port proxies configured for communication with FCoE nodes in an FCoE network; and
- a processor for proxying FCoE Initialization Protocol (FIP) functions between the FCoE nodes and the FCoE forwarder;
- wherein proxying FIP functions comprises proxying FIP virtual local area network discovery.

9. The apparatus of claim 8 wherein the apparatus comprises a plurality of said virtual node port proxies and the processor is configured to map each of the FCoE nodes to one of said virtual node port proxies.

10. The apparatus of claim 8 wherein proxying FCoE FIP functions comprises proxying FCoE forwarder FIP advertisements at the apparatus to associate one of the FCoE nodes with the FCoE forwarder.

11. The apparatus of claim 8 wherein proxying FCoE FIP functions comprises proxying keep alive messages to verify reachability with the FCoE nodes at the apparatus.

12. The apparatus of claim 11 wherein the processor is further configured for multiplexing keep alive messages from the FCoE nodes into a single keep alive message and transmitting said keep alive message to the FCoE forwarder.

13. The apparatus of claim 8 wherein the apparatus is configured for direct connection to the FCoE forwarder and wherein the processor is further configured for using physical connectivity events to determine reachability between the apparatus and the FCoE nodes and between the apparatus and the FCoE forwarder.

14. The apparatus of claim 8 wherein the processor is further configured for load balancing traffic between the FCoE nodes and the FCoE forwarder.

15. An apparatus comprising:
- means for defining a virtual node port proxy and virtual fabric port proxies at a Fibre Channel over Ethernet (FCoE) bridge, said virtual node port proxy configured for communication with an FCoE forwarder, each of said virtual fabric port proxies configured for communication with an FCoE node in an FCoE network; and
- means for proxying FCoE Initialization Protocol (FIP) functions between the FCoE node and the FCoE forwarder;
- wherein physical connectivity events are used to determine reachability between the apparatus and the FCoE nodes or between the apparatus and the FCoE forwarder.

16. The apparatus of claim 15 wherein means for proxying FIP functions comprises means for proxying FIP virtual local area network discovery at the apparatus.

17. The apparatus of claim 15 wherein means for proxying FCoE FIP functions comprises means for proxying FCoE forwarder FIP advertisements at the FCoE bridge to associate one of the FCoE nodes with the FCoE forwarder.

18. The apparatus of claim 15 wherein means for proxying FCoE FIP functions comprises means for proxying keep alive messages to verify reachability with the FCoE nodes or the FCoE forwarder at the apparatus.

19. The apparatus of claim 15 wherein the virtual node port proxy comprises a plurality of virtual node port proxies and wherein each of the FCoE nodes are mapped to one of said virtual node port proxies at the apparatus.

20. The apparatus of claim 15 further comprising means for load balancing traffic at the FCoE bridge.

* * * * *